United States Patent [19]

Bonsack

[11] 4,442,076

[45] * Apr. 10, 1984

[54] ENTRAINED DOWNFLOW CHLORINATION OF FINE TITANIFEROUS MATERIAL

[75] Inventor: James P. Bonsack, Aberdeen, Md.

[73] Assignee: SCM Corporation, New York, N.Y.

[*] Notice: The portion of the term of this patent subsequent to Aug. 10, 1999 has been disclaimed.

[21] Appl. No.: 442,313

[22] Filed: Nov. 17, 1982

[51] Int. Cl.³ .............................................. C01G 23/02
[52] U.S. Cl. ........................................ 423/78; 423/79; 75/1 T
[58] Field of Search ...................... 423/76, 78, 79, 492; 75/1 T

[56] References Cited

U.S. PATENT DOCUMENTS

| | | | |
|---|---|---|---|
| 2,589,466 | 3/1952 | Wilcox | 23/87 |
| 3,466,169 | 9/1969 | Nowak et al. | 75/112 |
| 3,495,936 | 2/1970 | Jones, Jr. | 23/87 |
| 3,787,556 | 1/1974 | Piccolo et al. | 423/77 |
| 3,859,077 | 1/1975 | Othmer | 75/1 |
| 3,897,537 | 7/1975 | Robinson et al. | 423/610 |
| 3,977,862 | 8/1976 | Glaeser | 75/1 T |
| 3,977,863 | 8/1976 | Glaeser | 75/1 T |
| 3,977,864 | 8/1976 | Glaeser | 75/1 T |
| 3,989,510 | 11/1976 | Othmer | 75/1 T |
| 4,014,976 | 3/1977 | Adschi et al. | 423/74 |
| 4,017,304 | 4/1977 | Glaeser | 75/33 |
| 4,183,899 | 1/1980 | Bonsack | 423/79 |
| 4,279,871 | 7/1981 | Bonsack | 423/74 |
| 4,310,495 | 1/1982 | Bonsack | 423/76 |
| 4,329,322 | 5/1982 | Bonsack et al. | 423/74 |
| 4,343,775 | 8/1982 | Bonsack | 423/1 T |

Primary Examiner—Herbert T. Carter
Attorney, Agent, or Firm—R. A. Sturges; M. H. Douthitt

[57] ABSTRACT

An entrained flow process for chlorinating fine iron-containing titaniferous powder with chlorine gas and/or organochlorides in the presence of fine porous coal-based reductant powder for obtaining product chlorides of titanium and iron wherein said both of said powders are entrained in and flow downwardly through a chlorination reaction zone at a temperature of at least about 800° C. is improved by: (a) supplying fine titaniferous and reductant powders to said reaction zone at a rate sufficient for establishing and maintaining titanium, iron and carbon reactants therein in substantial excess over those stoichiometric for the complete reaction of the chlorine present; (b) employing as at least the major portion of fresh reductant feed reactive char having surface area of at least about 10 m.²/g. and particle size of −140 mesh; (c) separating carbon and titaniferous solids from the effluent of said reaction zone; and (d) recycling at least a major portion of the resulting separated solids as about −140 mesh powder into said reaction zone.

4 Claims, 4 Drawing Figures

ENTRAINED DOWNFLOW CHLORINATION OF FINE TITANIFEROUS MATERIAL

This invention relates to an improvement in an entrained downflow process for chlorinating fine titaniferous material with chlorine and/or organochlorides in the presence of coal-derived, fine porous reductant.

BACKGROUND OF THE INVENTION

The basic entrained flow process is described in my U.S. Pat. No. 4,343,775 of Aug. 10, 1982. Therein certain powdered anthracite-derived reductant is used in a downflow chlorination zone with such vaporous chorinating agent and titaniferous powder at elevated temperature. The fundamental stoichiometry of that chlorinating operation can be exemplified fairly fundamentally by the following equations I and II wherein chlorine gas reacts with titanium dioxide and solid carbon:

$$TiO_2(s) + 2Cl_2(g) + C(s) \rightarrow TiCl_4(g) + CO_2(g) \quad \text{I.}$$

$$TiO_2(s) + 2Cl_2(g) + 2C(s) \rightarrow TiCl_4(g) + 2CO(g) \quad \text{II.}$$

Iron is a common impurity in many titaniferous feeds for the present operation. An entrained flow process can chlorinate titanium and iron values simultaneously according to the stoichiometry exemplified and generalized by the following enumerated equations wherein the titaniferous feed is $FeTiO_3$ particles:

$$2FeTiO_3(s) + 6Cl_2(g) + 3C(s) \rightarrow 2TiCl_4(g) + 3CO_2(g) + 2FeCl_2(g) \quad \text{III.}$$

$$FeTiO_3(s) + 3Cl_2(g) + 3C(s) \rightarrow TiCl_4(g) + 3CO(g) + FeCl_2(g) \quad \text{IV.}$$

$$2FeTiO_3(s) + 7Cl_2(g) + 3C(s) \rightarrow 2TiCl_4(g) + 3CO_2(g) + 2FeCl_3(g) \quad \text{V.}$$

$$2FeTiO_3(s) + 7Cl_2(g) + 6C(s) \rightarrow 2TiCl_4(g) + 6CO(g) + 2FeCl_3(g) \quad \text{VI.}$$

As would be evident to one skilled in this art, some vaporous organochloride present, such as carbon tetrachloride, would be expected to supply some carbon and chlorine for the reaction, and a titaniferous feed of other specific composition also would call for adjustment in reactant feeds.

U.S. Pat. No. 4,343,775 points out that the entrained downflow reaction proceeds apace with fresh, finely-divided anthracite-derived reductant having micropores (i.e., pores having effective diameter of 20 Å or less in size) that provide a substantial proportion of the carbon surface area of such fresh feed. Furthermore, in my copending U.S. patent application entitled "Chlorination of Titanium Ores Using Lignitic Reactive Carbons", Ser. No. 442,284, of even date herewith, it is pointed out that porous lignitic-derived carbon (such as char from brown coal or lignite) has an unexpected advantage relative to anthracite-derived reductant, namely that of substantially maintaining its useful surface area when it is employed to chlorinate titaniferous materials such as ore in a conventional fluidized bed operation. Thus, as such lignitic char-employing fluidized bed operation continues, the activity of such reductant resists deterioration rather than tending to deteriorate as could occur when anthracite-derived reductant is employed in such bed.

Other of my U.S. patents relevant to chlorination of titaniferous materials include: U.S. Pat. Nos. 4,183,899; 4,279,871; 4,310,495; and 4,329,322. The teachings of all the patents cited above are expressly incorporated by reference into this application.

Advantages of the instant improvement include not only those obtainable from an entrained downflow chlorination of titaniferous material like that of U.S. Pat. No. 4,343,775, but also a more rapid reaction than that of such patent with attendant economies, such as to apparatus and/or throughput. Also, in one aspect, namely that of using carbonaceous reductant derived from low-rank coal such as lignite like the porous reductant of Ser. No. 442,284, substantial adverse change in the surface area of the carbon can be averted. In fairness, though, it must be pointed out that such benefit in connection with the instant improvement would not be expected to be of the same large magnitude that can occur in connection with the fluid bed process of said companion application.

BROAD STATEMENT OF THE INVENTION

The present invention is an improvement in an entrained flow process for chlorinating fine iron-containing titaniferous powder with chlorine gas and/or organochlorides in the presence of fine porous, coal-based reductant powder for obtaining as products titanium and iron chlorides wherein both said powders are entrained in and flow downwardly through a chlorination zone at a temperature of at least about 800° C.

Such improvement comprises supplying titaniferous and reductant powders of −140 mesh to said reaction zone at a rate sufficient for establishing and maintaining the titanium, iron, and carbon reactants therein in substantial excess over those stoichiometric for complete reaction of the chlorine present; employing as fresh reductant powdered coal char having surface area of at least about 10 m.$^2$/g. and particle size of −140 mesh; separating carbon and titaniferous solids from the effluent of said reaction zone; and recycling at least a major portion of the resulting separated solids as −140 mesh powder into said reaction zone.

Advantageously the improvement is operated so as to separate carbon and titaniferous solids from the reaction zone effluent at a temperature above the dew point of ferrous chloride. Also advantageously, the entire fresh reductant feed to the process is lignitic char. The reductant used advantageously has surface area of at least about 100 m.$^2$/g., said excess of reactants is at least about 10%, the chlorinating agent is chlorine gas, and the chlorination temperature is at least about 1000° C.

DETAILED DESCRIPTION OF THE INVENTION

Figure 1:
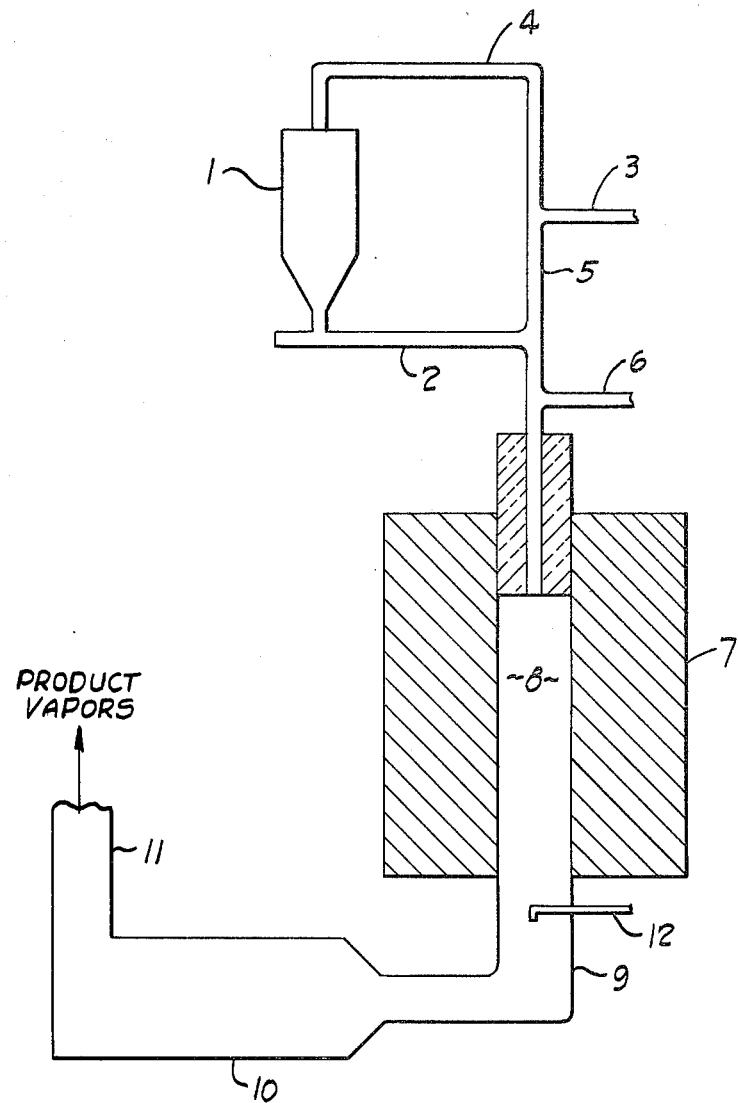
FIG. 1 of the drawings shows laboratory apparatus suitable for entrained flow chlorination in a once-through operation.

Typical titaniferous feeds include ilmenite, anatase, rutile, brookite, titaniferous slag, and fine rutile recovered from porphyry copper mining tailings. Such should pass through a 140-mesh (U.S.S.) sieve. Advantageously it is −200 mesh, and usually substantially all of such feed is −325 mesh.

While the fresh reductant can be a porous material obtained from anthracite (which itself is a ANSI/ASTM Class I coal), for the instant improvement it is better when obtained from a coal of lower rank, in other words, a bituminous, sub-bituminous, or lignitic coal. The fresh reductant should be microporous and have a surface area of at least about 10, and, advantageously, at least about 100 m.$^2$/g. Fresh reductant can be made by pyrolysis, partial combustion, and/or steaming of the coal, and, for convenience herein, will be referred to as a "char" regardless of source. Lignitic (brown) coal typically is available from Australia, Texas, and North Dakota. Suitable char particle size also should be −140 mesh and finer, advantageously −200 mesh, and preferably substantially all of it should pass through a 325-mesh sieve. The chemical and physical properties of typical lignitic chars especially useful as fresh feed for the instant improvement are tabulated below.

| Analysis | Australian Brown Coal Char | Texas Lignite-Based Char |
| --- | --- | --- |
| C, wt. % | 91.9 | 80.0 |
| H, wt. % | 0.9 | 0.8 |
| Ash, wt. % | 2.3 | 12.0 |
| Volatile Matter, wt. % | 5.6 | 6.6 |
| Surface Area, m.$^2$/g. | 147 | 625 |

Useful fresh reductant feeds for this improvement generally will have not substantially more than about 1500 m.$^2$/g. of internal surface area and, preferably, not substantially more than about 1000 m.$^2$/g of internal surface area. A typical brown coal char as shown above, has surface texture quite similar to that of the treated anthracite shown in my U.S. Pat. No. 4,343,775 and my copending application Ser. No. 442,284. It will have most of its surface area within micropores of 20 Å diameter or less. The maximum pore diameter of such carbon usually is in the 20–60 Å range. A typical Char derived from lignite coal, as shown above, is different in surface texture. Most of its surface area is within the pores that are greater than 20 Å in diameter, and the maximum pore diameter is typically 450 Å. During the instant chlorination the microporosity of a lignitic carbon remains relatively stable as the carbon is consumed, and there can be a relatively large increase in pores greater than 20 Å in diameter when such carbon is used repeatedly in a recycle operation. Surface area expressed throughout this specification is "effective surface area" as determined from the N$_2$ absorption isotherm at −195° C. and application of the Brunauer, Emmett, and Teller (BET) procedure. A Digisorb 2500-Automatic Multi-gas Surface Area and Pore Volume Analyzer made by Micromeritics Instrument Corporation, Norcross, GA, is useful for making these measurements.

The fresh reductant introduced into the process is best dry. However, water often is used to suppress dusting of carbonaceous material during transportation, or as a remnant from washing, flotation, other processing, or unprotected storage. Accordingly, the fresh reductant is best dried before milling to avoid caking and fed to the chlorinator dry to avoid substantial HCl formation and consequent substantial chlorine loss that way. Anthracite coal can be activated for the instant purpose by steam. Most lower rank coals for the instant purpose require raising their temperature to drive off most of their combined hydrogen.

The fresh feed solids and recycled feed solids (titaniferous material plus carbon) concentration in total within the chlorination reaction zone typically is maintained at about 0.01 lb./ft.$^3$ to about 0.20 lb./ft.$^3$ and preferably is less than about 0.06 lb./ft.$^3$, basis solids entering the zone.

The preferred chlorine-providing material is chlorine gas. Organochlorides such as carbon tetrachloride, hexachlorobenzene, and/or carbonyl chloride also can be used in vapor form in the reactor.

The chlorination reaction zone in the instant improvement is an elongated chamber having an inlet for the particulate reactants and the chlorine-providing vapor at or near the top and an outlet for titanium chlorides and by-product materials (effluent) at or near the bottom of the chamber. The particulate materials flow through the chamber by gravity with the chlorinating agent and any secondary carrying gas flow downwardly. To prevent build-up of solids on the walls and allow for continuous operation the inner walls of the chamber should be vertical or nearly vertical, that is, within 15° of the vertical.

During the reaction process the temperature within the chlorination reaction zone is maintained at least about 800° C. and advantageously about 1000° C. or greater. Chlorination temperature advantageously is about 1000°–1200° C., although it can be substantially higher. Retention time of solids in the chlorination reaction zone is between about 1 and 20 seconds and, advantageously, about 8–10 seconds.

It is of special advantage to maintain the effluent stream from the chlorination zone above the dew point of ferrous chloride. Recycle of this material does not help the reaction or the reactor. Accordingly, the chlorinator is best run at a temperature above such dew point, and the effluent stream is maintained above such dew point for separating solids from it. The effluent contains product titanium chlorides, by-product gases, and particulates.

Solids are separated most efficiently from the chlorination zone effluent stream by a cyclone-type separator to provide vapors containing the titanium chlorides to further processing and collect a mixture of titaniferous and carbon solids. Such solids usually will be of appropriate fineness for direct recycle to the chlorinator along with the fresh solid feeds and chlorinating agent. If the recycle solids need to be classified or comminuted for any reason, they can be so processed in conventional manner.

For efficiency and economy the recycle flow of solids should be substantial so as to maintain the titanium, incidental iron, and carbon reductants in the total solids of feeds substantially in excess of that stoichiometric for complete reaction of the chlorine feed. Reference is made to the enumerated equations earlier in this specification for the basic representative stoichiometry. In this connection, to keep porosity of the recycled carbon from degrading in such recycling operation, the fresh reductant feed advantageously is entirely lignitic char. A typical minimum excess of titanium, iron, and carbon reductants of those stoichiometric for complete reaction of the chlorine present is at least about 5%; desirably it is at least about 10%, and can reach even about 75-350% or more when the chlorination zone retention time is short.

The following examples develop the principles of this invention in a specific manner, but should not be construed as limiting the invention. In this specification all temperatures are in degrees C., all parts are parts by weight, and all percentages are weight percentages unless otherwise expressly indicated. For this specification the retention time of reactants in the chlorination reaction zone is calculated as the retention time of vapors in said zone assuming plug flow at the temperature and pressure (normally 1 atmosphere total pressure) of the zone, although higher or lower pressure operation is possible.

INTRODUCTION TO THE EXAMPLES

Referring to FIG. 1, a predetermined mixture of comminuted titanium ore (Brazilian anatase) and carbon reductant is prepared and charged into hopper 1 for each run. Vertical quartz reactor tube 8, having inside diameter of 7 cm. and a heated length of 105 cm., is heated to operating temperature of 1000° C. by electrical resistance furnace 7. During its heatup the apparatus is purged with argon introduced through line 3. When the chlorination reactor temperature stabilizes at the desired operating temperature, the argon is turned off. Simultaneously, then, feeds of charge solids through line 2 and chlorine gas through line 6 are introduced to reactor 8, along with nitrogen gas through line 3. The ore in each instance contains about 86.5% $TiO_2$, 3.3% $Fe_2O_3$, and 0.3% combined H.

Properties of the solid reactants exemplified are:

| Analysis | Solids Charge With Steam-Treated Anthracite Char | Solids Charge With Lignitic Char | Solids Charge With Petroleum Coke |
| --- | --- | --- | --- |
| $TiO_2$, % | 50.30 | 50.30 | 54.90 |
| C, % | 33.50 | 33.50 | 36.60 |
| H, % | 0.40 | 0.54 | 0.21 |
| Fe, % | 1.30 | 1.30 | 1.42 |
| Reductant Surface Area, $m^2$/g. | 365 | 574 | 1 |
| Particle Size of Solids, % −325 Mesh | 96 | 96 | 96 |

Samples of gas leaving the bottom of zone 8 are taken through line 12 and analyzed for CO, $CO_2$, $N_2$, and $Cl_2$ by gas chromatography. The amount of unreacted $Cl_2$, if any, is calculated from the known inlet flows of $Cl_2$ and $N_2$ and the measured flows of product and by-product vapors. The hot reactor effluent (about 1000° C.) flows through outlet 9 into solids separator 10. In separator 10 solids are retained while product and by-product vapors ($TiCl_4$, iron and trace metal chlorides, HCl, carbon oxides and inert gases such as nitrogen) are discharged through outlet 11.

EXAMPLES 1-17

The Stoichiometric Factor calculated for each of 17 exemplary runs (Examples 1-17, inclusive) is based on the amount of Ti, Fe, and combined H in the feed solids available to react with the chlorine feed to give $TiCl_4$, $FeCl_2$, and HCl. A factor of 1.0 indicates the Stoichiometric amount of Ti, Fe, and such H present to react with that chlorine. A Stoichiometric Factor of 2.0 indicates a two-fold stoichiometric excess of such Ti, Fe, and H. Feed rates and gas flows in each run are controlled to provide an approximate retention time in the reactor of 10 seconds.

Ore and anthracitic char is fed to the reactor in runs 1-7 at Stoichiometric Factors of 1.00, 1.15, 1.20, 1.25, 1.55, 1.63, and 2.90, respectively. Ore and lignitic char is fed to the reactor in runs 8-13 at Stoichiometric Factors of 0.75, 1.10, 1.25, 1.27, 1.60, and 1.70, respectively. Ore and petroleum coke is fed to the reactor in runs 14-17 at Stoichiometric Factors of 1.95, 2.20, 3.15, and 4.85, respectively.

Figure 2:
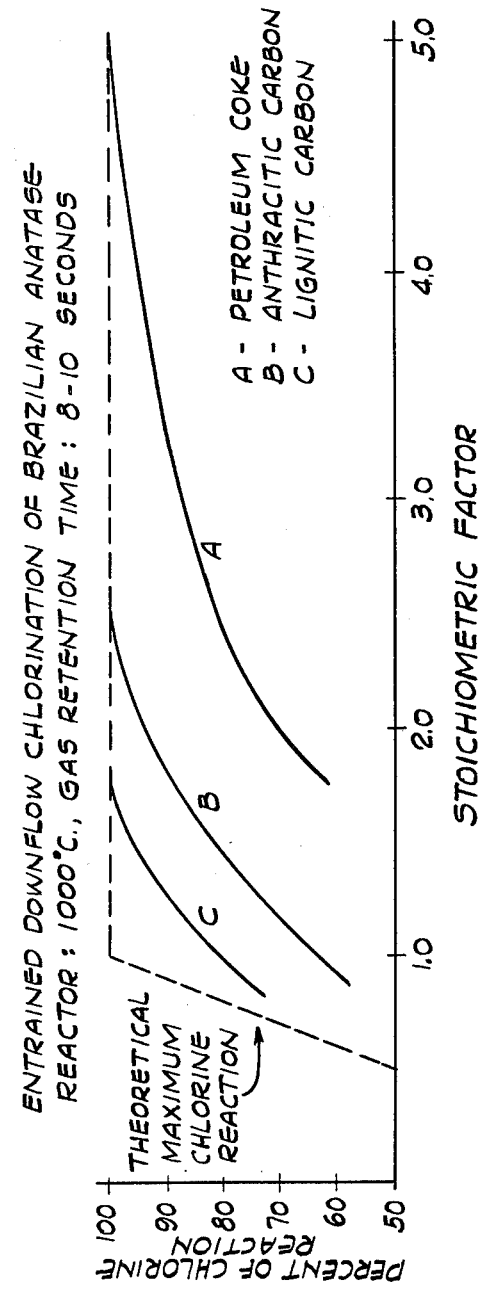
FIG. 2 sets forth stoichiometric factors for chlorinating Brazilian anatase ore with various typical reductants.

The percentage of chlorine reacting at each Stoichiometric Factor is plotted in FIG. 2. Unreacted ore and carbon recovered from runs 2, 3, and 4 were composited; likewise from runs 9, 10, and 11. The unreacted ore and carbon from run 14 was reserved. These recovered materials (from runs made near the stoichiometric ratio of 1) are washed free of water-soluble chlorination products prior to determination of the surface area of the recovered carbons. Said carbon surface areas from the composite of runs 2, 3 and 4 (using anthracite char) is 233; from the composite of runs 9, 10, and 11 (using lignitic char), 572; from run 14 (petroleum coke), 1, all in $m.^2$/g.

Figure 3:
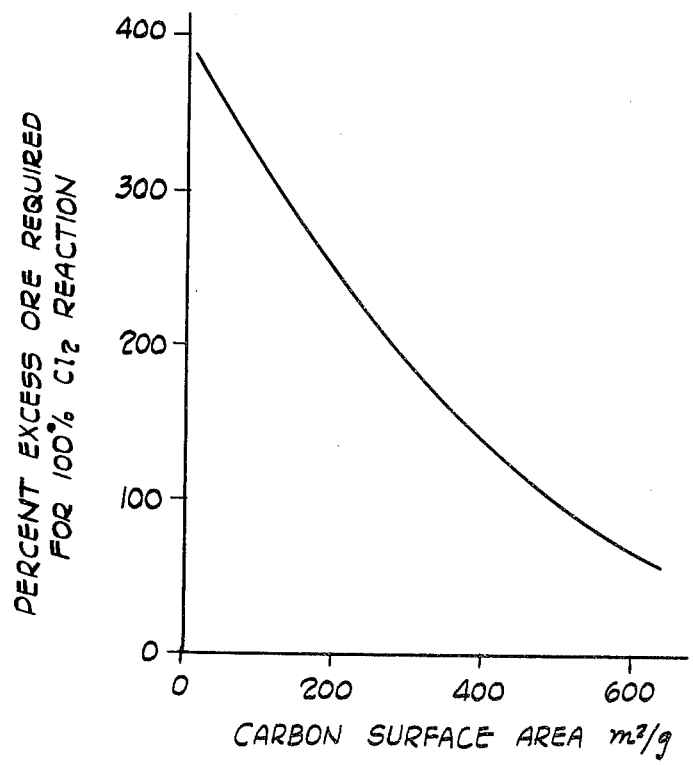
FIG. 3 is a plot of carbon surface area of such reductants versus the excess of such ore required for complete chlorine gas reaction when using such reductants.

Reference is made now to FIG. 3. This plot shows that the reaction efficiency of chlorine with the ore is related directly to the internal surface area of the carbon used, and that the excess ore required for complete chlorine reaction decreases nearly linearly with increasing carbon surface area. Complete reaction of chlorine can be attained either by increasing the retention time in the chlorination zone or by increasing the amount of excess ore and carbon. Increasing such retention time is the less desirable alternative because this increases the chlorination reactor size and cost.

Referring again to FIG. 2, about 80% of the chlorine reacts when a stoichiometric amount of ore and the lignitic carbon is in the reaction zone for 10 seconds. If the retention time in the reactor is increased, the proportion of chlorine reacted will increase until at some higher retention time virtually all of the chlorine will react. The more practical approach for attaining complete reaction of the chlorine is to feed a 75% excess of ore and lignitic carbon while using a 10-second reaction time. Using even more than a 75% excess will shorten the required retention time in the chlorinator.

The preferred approach of using a substantial excess of ore and carbon to attain complete chlorine reaction can be effected by recycling unreacted ore and carbon to the inlet of the entrained flow chlorinator. Thus, there needs to be no appreciable loss of ore and carbon while obtaining complete use of the chlorine.

EXAMPLE 18

Figure 4:
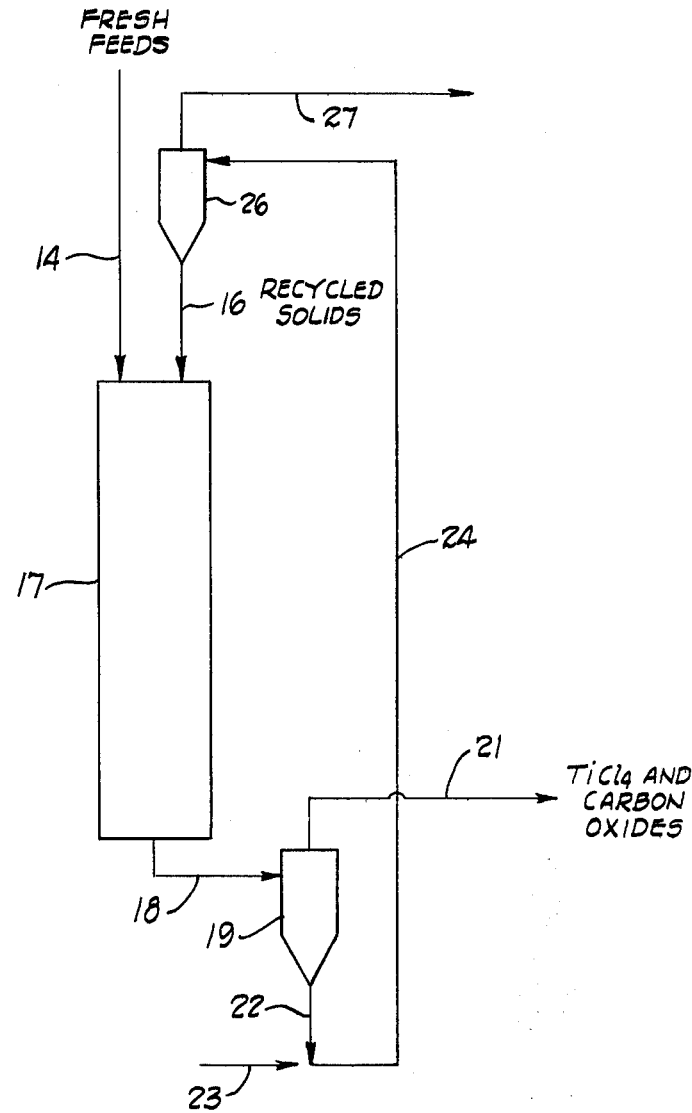
FIG. 4 is a process flow diagram showing how the instant improvement can be used in preferred manner. The drawings will be described in detail in connection with the text that follows.

Reference is made to flow diagram of FIG. 4. It shows a generalized scheme for producing titanium tetrachloride from chlorine gas, and the fine lignitic char and the fine ore of Examples 1-17 when using a recycle of recovered solids from the reactor effluent, a chlorination reaction zone temperature of 1000° C., and a retention time in that zone of 10 seconds. Materials of construction for the apparatus are those conventional for high temperature and corrosion-resistance, e.g., high silica brick, ceramics, and specialty alloys, high nickel ones often being preferred.

A fresh solids feed of milled ore and char and a feed of chlorine gas pass through line 14 and enter the top of chlorination reaction zone 17. Simultaneously a feed of recovered recycled solids enters zone 17 from line 16. These recycle and fresh feeds of solids provide enough carbon, titanium, iron, and hydrogen for reacting with all of said chlorine feed to the reaction zone, thereby forming $TiCl_4$, iron chlorides, HCl, and carbon oxides—CO and $CO_2$—as vapors and unreacted titaniferous and carbon solids in said zone.

The excess of ore in said zone over that stoichiometric for reacting with all said chlorine is 75%; for practical operation the corresponding excess of carbon is maintained somewhat higher than that. At a steady state condition substantially all of such excess comes from the recycle flow of solids.

Effluent from the bottom of chlorination zone 17 passes through line 18 into cyclone separator 19. This separator is operated near the chlorinator temperature, that is about 1000° C. This prevents condensation of metal chloride impurities such as ferrous chloride, which has dew point between 700° and 900° C. according to the operating conditions and feedstock composition. Essentially only unreacted ore and carbon are removed from the effluent by this solids separator. These solids flow from separator 19 through line 22, then are recycled through line 24 and into hopper 26 by pneumatic transport. For such transport an inert or non-oxidizing gas such as nitrogen than would not combust the hot carbon can be used as a "lift gas" that enters from line 23. Lift gas exits through line 27. Alternatively, a bucket elevator or the like could be used to recycle solids back to hopper 26. As shown in connection with the previous examples, the lignitic char surface area (and its reactivity for the instant purpose) does not change appreciably during its consumption for the chlorination of the ore. Therefore, the recycled carbon is as reactive as the fresh feed of char. $TiCl_4$ and carbon oxides are withdrawn from separator 19 through line 21.

To practice substantially the same recycling operation and fully utilize the chlorine with the anthracitic char of Examples 1–17 instead of such lignitic char would require a much heavier recycle flow. The surface area of unreacted anthracitic char decreases during its recycling through the chlorination zone. When such anthracitic carbon is kept in and recycled to the chlorination zone until it is virtually completely reacted, such carbon will lose about ¾ of its original surface area. Thus, for the anthracitic char tabulated above, the equilibrium surface area would go down from 365 to about 91 m.²/g. of carbon content. Referring to FIG. 3, it is evident that a carbon of such equilibrium surface area would require at least about 340% excess ore and coke for reacting the chlorine completely under the conditions set forth here. In other words, the required excess of ore and coke would increase from at least about 150% at start-up to at least about 340% at steady state.

Consider the condition where an anthracitic and lignitic char have the same initial surface area, say, usually 500 m.²/g. The required excess ore and lignitic carbon is about 100% (as evident from FIG. 3) at start-up, and at steady state it would be about the same. The anthracitic carbon will decrease in surface area to about 125 m.²/g. at steady state. This, then, would require an excess of such anthracitic char of about 100% at start-up, and such excess needed would reach about 310% at steady state. Thus, when such chars have about that same initial reactivity, the use of the lignitic char would require only about ⅓ of the recycle load needed for such anthracitic char for maintaining about equivalent reactivity.

Lignite and bituminous coals (not chars) themselves have too much available hydrogen (which uses chlorine to form HCl) to be attractive here. Anthracite coal itself is low in such hydrogen, but it needs activation (development of some microporosity) to be used in an entrained flow process. However, the possibility of utilizing at least some anthracite coal itself and activating it, especially where a high recycle of carbon is desirable, should not be overlooked. Thus, this improvement admits to the possibility of, say, starting on lignitic or other suitable char, then replacing recycle carbon with anthracite coal or other coal that is appropriately sized, and appropriately activated in process, before it reaches the chlorination zone.

What is claimed is:

1. In an entrained flow process for chlorinating fine iron-containing titaniferous powder with chlorine gas and/or organochloride in the presence of fine porous coal-based reductant powder for obtaining as products titanium and iron chlorides wherein both of said powders are entrained in and flow downwardly through a chlorination reaction zone at a temperature of at least about 800° C., the improvement which comprises:
    supplying titaniferous and reductant powders of −140 mesh to said reaction zone at a rate sufficient for establishing and maintaining titanium, iron, and carbon reactants therein in substantial excess over those stoichiometric for complete reaction of the chlorine present;
    employing as at least the major portion of fresh reductant powdered reactive coal char having surface area of at least about 10 m.²/g. and particle size of −140 mesh;
    separating carbon and titaniferous solids from the effluent of said reaction zone; and
    recycling at least the major portion of the resulting separated solids as −140 mesh powder into said reaction zone.

2. The process of claim 1 wherein the separation of said carbon and titaniferous solids from the reaction zone effluent is done at temperature above the dew point of ferrous chloride.

3. The process of claim 1 wherein the entire fresh reductant feed is lignitic char.

4. The process of claim 1 wherein said reductant has surface area of at least about 100 m.²/g., said excess of reactant is at least about 10%, the chlorination agent is chlorine gas, and the chlorination temperature is at least 1000° C.

* * * * *